United States Patent
Cheng et al.

(10) Patent No.: US 9,036,154 B2
(45) Date of Patent: *May 19, 2015

(54) FOUR-AXIS FOUR-SUBDIVIDING INTERFEROMETER

(71) Applicants: Shanghai Institute of Optics and Fine Mechanics, Chinese Academy of Sciences, Shanghai (CN); Shanghai Micro Electronics Equipment Co., Ltd., Shanghai (CN)

(72) Inventors: Zhaogu Cheng, Shanghai (CN); Jianfang Chen, Shanghai (CN); Ya Cheng, Shanghai (CN); Huijie Huang, Shanghai (CN); Feng Chi, Shanghai (CN)

(73) Assignees: Shanghai Institute of Optics And Fine Mechanics, Chinese Academy of Sciences, Shanghai (CN); Shanghai Micro Electronics Equipment Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,984

(22) Filed: Jan. 10, 2014

(65) Prior Publication Data

US 2014/0160489 A1 Jun. 12, 2014

Related U.S. Application Data

(63) Continuation of application No. PCT/CN2011/001273, filed on Aug. 2, 2011.

(30) Foreign Application Priority Data

Jul. 22, 2011 (CN) .......................... 2011 1 0206450

(51) Int. Cl.
*G01B 9/02* (2006.01)
(52) U.S. Cl.
CPC ........ *G01B 9/02027* (2013.01); *G01B 9/02007* (2013.01); *G01B 9/02056* (2013.01); *G01B 9/02021* (2013.01); *G01B 2290/70* (2013.01)

(58) Field of Classification Search
CPC ......... G01B 9/02; G01J 9/04; G03F 7/70775; G03F 7/70716; G01D 5/266
USPC .......................................................... 356/487
See application file for complete search history.

(56) References Cited

U.S. PATENT DOCUMENTS

| 3,529,894 A | 9/1970 | Hock |
| 4,758,133 A * | 7/1988 | Clark et al. .................... 417/360 |

(Continued)

FOREIGN PATENT DOCUMENTS

| CN | 1510390 A | 7/2004 |
| CN | 101245984 A | 8/2008 |

(Continued)

OTHER PUBLICATIONS

Cheng, Jishui, "Study on interferometer measurement error model in wafer stage," Chinese Master's Theses full-text database—Engineering science and technology II. May 15, 2010, No. 5, pp. 9-13, ISSN 1674-0246.

(Continued)

*Primary Examiner* — Tarifur Chowdhury
*Assistant Examiner* — Md Rahman
(74) *Attorney, Agent, or Firm* — Manni Li; Mei & Mark LLP

(57) ABSTRACT

Four-axis four-subdividing interferometer comprising a four-axis light splitting module and an interference module which are sequentially arranged along the incident direction of polarization orthogonal double-frequency laser. The four-axis light splitting system comprises three 50% plane beam splitters and three 45-degree plane reflecting mirrors. The invention comprises a four-axis four-subdividing plane mirror interferometer and a four-axis four-subdividing differential interferometer. In the differential interferometer, an adjustable 45-degree reflecting mirror is used to guide the reference light to a reference reflecting mirror which is arranged in the same direction as a measurement mirror and fixed on the moving object.

6 Claims, 2 Drawing Sheets

(56) References Cited

U.S. PATENT DOCUMENTS

| | | | |
|---|---|---|---|
| 4,883,357 A | | 11/1989 | Zanoni et al. |
| 5,404,222 A | * | 4/1995 | Lis ................................ 356/487 |
| 5,537,209 A | * | 7/1996 | Lis ................................ 356/487 |
| 2003/0197869 A1 | | 10/2003 | Johnstone et al. |
| 2006/0087657 A1 | | 4/2006 | Holmes et al. |

FOREIGN PATENT DOCUMENTS

| | | |
|---|---|---|
| CN | 101413783 A | 4/2009 |
| CN | 101907443 A | 12/2010 |
| CN | 102033413 A | 4/2011 |
| TW | 200615505 A | 5/2006 |

OTHER PUBLICATIONS

Deng, Shang, "Subdivision technology of laser interferometer," Tool Engineering, Dec. 31, 2005, No. 7, vol. 39, pp. 94-95, ISSN 1000-7008.

* cited by examiner

FOUR-AXIS FOUR-SUBDIVIDING INTERFEROMETER

CROSS-REFERENCE AND RELATED APPLICATIONS

The subject application is a continuation of PCT international application PCT/CN2011/001273 filed on Aug. 2, 2011, which in turn claims priority on Chinese patent application No. CN 201110206450.2 filed on Jul. 22, 2011. The contents and subject matter of the PCT and Chinese priority applications are incorporated herein by reference.

TECHNICAL FIELD OF THE INVENTION

The invention relates to a multi-axis interferometer, in particular, a four-axis four-subdividing interferometer having a four-axis four-subdividing differential interferometer and a four-axis four-subdividing plane mirror interferometer.

BACKGROUND OF THE INVENTION

The interferometer is an essential tool for precisely measuring the displacement, length, etc., of the target device. In the interferometer, the change in the length of the optical path is converted into displacement so as to precisely measure the displacement. The double-frequency laser has the advantages of high resolution, fast velocity measurement, large measurement scope, and capable of carrying out multi-axis synchronous measurement, and is widely used in the advanced manufacturing and nanotechnology, for example, for positioning and measuring the workpiece stage and the reticle stage of a mask aligner with high precision.

In order to measure the length, displacement, axial rotation, and many other degrees of freedom of the target device at the same time, a multi-axis interferometer including a plurality of laser beams can be used, with each laser beam corresponding to a measurement axis of the interferometer. In the multi-axis interferometer, the multi-axis light splitting beams must have equal energy and be parallel to each other. The quality of the design of the light splitting system is the key for the multi-axis splitting interferometer. A good light splitting system enables the interferometer to have high stability and consistent temperature drift of the light beams of the light paths.

Although the multi-axis interferometer has already been successfully applied in many fields, currently, the constantly pursuing goal is to continuously improve its performance so as to obtain an excellent measurement accuracy, especially to constantly improve the light splitting system of the multi-axis interferometer so as to obtain a good stability, a low temperature drift, nonlinear errors and adjustability. Therefore, the light splitting system of the multi-axis interferometer must be carefully designed in order to minimize the measurement error caused by the imbalance of the light path, such as thermal drift, nonlinear errors, etc. Currently, the multi-axis interferometer generally uses a block optical light splitting component, which is coated with a plurality of coatings of different requirements on a single surface, for splitting light. This light splitting method requires high precision in optical processing, and the same light splitting block need to be coated with a plurality of coatings of different requirements (such as anti-reflection, full-reflection, 50% of light splitting film, etc.) on the two light surfaces, which poses great difficulties for coating film. In addition, since the light splitting beams of the light paths have different paths in the block optical light splitting component, the temperature drift of the light beams of the light paths is inconsistent. This structure will generally also causes the difference in the transmission distances of the measuring beam and the reference beam in the medium (such as quartz glass). Furthermore, since the geometrical position between each light splitting surface and reflecting surface in the block optical light splitting component is fixed, each light splitting beam cannot be adjusted separately. Therefore, such light splitting system has the disadvantages of poor consistence of the temperature drift of the light beams of the light paths, difficulties in the adjustment of the light path, etc., in the application. Similarly, the general differential interferometer uses the 45-degree block light splitting component to send the reference light to the reference reflecting mirror. Since the measurement beam and the reference beam have different paths in the optical component, it will cause different temperature drifts and measurement errors.

SUMMARY OF THE INVENTION

The object of the invention is to overcome the above mentioned deficiencies and provide a four-axis four-subdividing interferometer. The interferometer has the advantages that the components are easy to process, the light path adjustment is easy, nonlinear errors are fewer, the temperature drift of the light beams of the light paths is consistent, and the like.

The four-axis four-subdividing interferometer of the invention comprises a four-axis light splitting module and an interference module which are sequentially arranged along the incident direction of polarization orthogonal double-frequency laser.

The four-axis light splitting module comprises three plane beam splitters with 50% of splitting ratio and three 45-degree full-reflecting mirrors, the position relationship being as follows:

the first 45-degree plane beam splitter with 50% of splitting ratio being arranged in the incident direction of double-frequency laser, the first full-reflecting mirror being arranged above the first 45-degree plane beam splitter, the second plane beam splitter and the third plane beam splitter with 50% of splitting ratio being arranged in the same vertical plane sequentially from bottom to top, and the second 45-degree full-reflecting mirror and the third 45-degree full-reflecting mirror being arranged in another vertical plane sequentially from bottom to top, which is parallel to the vertical plane where is the second plane beam splitter and the third plane beam splitter are located;

the first 45-degree plane beam splitter dividing the incident polarization laser into a transmission beam and a reflection beam with equal energy, the second plane beam splitter being arranged along the direction of the transmission beam and being divided into a transmission beam and a reflection beam with equal energy via the second plane beam splitter, in which the reflection beam has a direction of propagation parallel to the transmission beam after being reflected by the second 45-degree full-reflecting mirror so as to form two output light in parallel to each other in the lower layer;

the reflection beam with 50% of energy reflected by the first 45-degree plane beam splitter changing its direction of propagation and being parallel to the incident laser after being reflected by the first full-reflecting mirror; the reflection beam being also incident to the third plane beam splitter again and being divided into a transmission beam and a reflection beam with equal energy via the third plane beam splitter, in which the reflection beam has a direction of propagation parallel to the transmission beam after being reflected by the third 45-degree full-reflecting mirror so as to form two output light in parallel to each other in the upper layer; in this way, a beam of double-frequency laser output from the laser being divided into four beams which have equal energy and are parallel to each other after passing through the four-axis light splitting module, two beams being in the upper and lower layers, respectively.

The interference module comprises a polarizing beam splitter, a first ¼ wave plate, and a measurement reflecting mirror being arranged in the light transmission direction of the polarizing beam splitter, a second ¼ wave plate and a reference reflecting mirror being arranged in the light reflection direction of the polarizing beam splitter, two strip rectangular prisms which are vertically arranged or four rectangular prisms which are arranged in two columns and two layers from down to top being arranged in the fourth direction of the polarizing beam splitter, and the measurement reflecting mirror being fixed on the object to be measured.

The interference module comprises a polarizing beam splitter, a first ¼ wave plate and a measurement reflecting mirror being arranged in the light transmission direction of the polarizing beam splitter, a second ¼ wave plate and an adjustable 45-degree full-reflecting mirror for changing the direction of propagation of the reference beam by 90 degrees being arranged in the light reflection direction of the polarizing beam splitter, a reference reflecting mirror being arranged in the light reflection direction of the adjustable 45-degree reflecting mirror, two strip rectangular prisms which are vertically arranged or four rectangular prisms which are arranged in two columns and two layers from down to top being arranged in the fourth direction of the polarizing beam splitter, and both the measurement reflecting mirror and the reference reflecting mirror being fixed on the object to be measured.

The four rectangular prisms are arranged as follows:

the upper layer: a first rectangular prism, a second rectangular prism; and the lower layer: a third rectangular prism, and a fourth rectangular prism.

The four-axis light splitting modules is used, which divides the incident light into four parallel beams with equal energy. The four parallel beams are used as the precision measurement of four degrees of freedom. Since this light splitting module is used, compared with the usual block light splitting method, the transmission distance of the four light beams relative to four measurement axes is significantly shortened in the quartz or glass medium, and the four light beams have equal transmission distance in the medium so that the consistence of the temperature drift of the light beams of the light paths is significantly improved, the measurement errors of the measurement axes resulted from the thermal drift can be efficiently reduced, and the nonlinear errors can be efficiently suppressed. In addition, since each 45-degree plane beam splitter and 45-degree reflecting mirror in the light splitting system can be separately adjusted, the beam corresponding to each measurement axis can also be independently adjusted. The four-axis light splitting module of the invention can be applied in all types of multi-axis interferometers, such as four-axis plane mirror interferometers, four-axis differential interferometers, etc.

For the plane mirror interferometer, the reference reflecting mirror is fixed inside the interferometer, and the measurement reflecting mirror is fixed on the object to be measured, such as the workpiece stage of a mask aligner. However, for the differential interferometer, the reference mirror and the measurement mirror are fixed on the object to be measured, respectively, such as the workpiece stage and the objective lens of a mask aligner.

In the four-axis four-subdividing differential interferometer adopting an adjustable 45-degree full-reflecting mirror, since the measurement beam and the reference beam have the same path in the optical component, such structure can further enables the interferometer to have a small temperature drift and reduce the nonlinear errors. Meanwhile, since the 45-degree reflecting mirror can be independently adjusted, the interferometer has the advantages that the components are easy to process, the light path adjustment is easy, and the like.

The light source is generally the He—Ne double-frequency laser, outputting two linear polarization beams which are equal in energy and mutually vertical in polarization direction. The two polarization components have a frequency difference of several MHzs and high frequency stability.

A polarization beam splitter divides each of the four parallel beams which have passed through the four-axis light splitting system into measurement beams and reference beams in accordance with the polarization features. The four measurement beams are the beams which have been transmitted by the four beams which have passed through the polarization beam splitter. However, the four reference beams are the beams which have been reflected by the four beams which have passed through the polarization beam splitter. Similarly, if the components of the interferometer are appropriately rearranged, the reference beams and the measurement beams can be exchanged, without changing the function of the interferometer.

The four measurement beams which are transmitted by the polarization beam splitter are transmitted to the measurement reflecting mirror after passing through the ¼ wave plate, and enter the polarization beam splitter via the ¼ wave plate after being reflected again. Since the four measurement beams pass through the ¼ wave plate twice, the polarization direction of the four measurement beams is rotated by 90 degrees so that the four measurement beams which enter the polarization beam splitter again are reflected (rather than transmitted) on the polarization beam splitter. The reflected four measurement beams enter four rectangular prisms, and then is reflected back to the polarization beam splitter. After being reflected by the polarization beam splitter, the four measurement beams will be reflected in the measurement reflecting mirror again. Hence, after passing through the ¼ wave plate twice, the polarization direction of four measurement beams is rotated by 90 degrees so that the four measurement beams which enter the polarization beam splitter again are transmitted and output on the polarization surface of the polarization beam splitter.

The four reference beams are reflected by the polarization surface of the polarization beam splitter. In the four-axis differential interferometer, an adjustable 45-degree reflecting mirror is used to send the reference light to the reference reflecting mirror fixed on the moving object. Four reference beams is incident on the 45-degree reflecting mirror after passing through the common ¼ wave plate, and then incident on the reference reflecting mirror after being reflected. The beam reflected by the reference reflecting mirror sends the reference beam which has passed through the ¼ wave plate again back to the polarization beam splitter after passing through the 45-degree reflecting mirror. The polarization surface is rotated by 90 degrees. After be transmitted by the polarization beam splitter and being refracted by the rectangular prism, the four reference beams will repeat the above processes via the common polarization beam splitter, the ¼ wave plate, the 45-degree reflecting mirror and the reference reflecting mirror. It will be reflected and output when reaching the 45-degree polarization surface of the polarization beam splitter again.

Subsequently, the four reference beams and the four measurement beams are combined with each other, respectively, and generate the beat frequency signal. The formed four output beams 21-26 are corresponding to a measurement axis, respectively. The output beam is detected by a detector and is processed by the computer software. The Doppler shift information of the moving object in the beat frequency signal is solved so as to obtain the moving object information of four degrees of freedom.

The light splitting principle of the invention can also be applied to the plane mirror interferometers, forming four-axis plane mirror interferometers. In the four-axis plane mirror interferometer, the reference reflecting mirror and the measurement reflecting mirror are arranged in the geometrical configuration vertical to each other. The four reference beams will be directly irradiated on the reference reflecting mirror with fixed position placed in the interferometer module, without being refracted by another 45-degree reflecting mirror.

Compared with the prior art, the invention has the following technical features:

1. The four-axis light splitting module of the four-axis four-subdividing differential interferometer and the four-axis four-subdividing plane mirror interferometer is consisted of three plane beam splitters with 50% of splitting ratio and three reflecting mirrors. A beam splitter with 50% of splitting ratio first divides the incident polarization laser into two beams with equal energy, in which the transmission beam is incident on a beam splitter with 50% of splitting ratio and is divided into two beams with equal energy via the beam splitter; however, the reflecting beam is also incident on another beam splitter with 50% of splitting ratio arranged in parallel after being reflected by a full-reflecting mirror, and is divided into two beams with equal energy via the beam splitter. In this way, four beams with equal energy will be used as the measured light source of the four degrees of freedom of the four-axis interferometer.

2. As the entire four-axis light splitting module uses the combination of the plane beam splitter and the reflecting mirror, compared with the usually adopted block optical light splitting component coated with a plurality of coatings with different requirements on a single surface, it has the advantages that the components are easy to process, the light path adjustment is easy, etc.

3. Similarly, since the entire four-axis light splitting module only uses the combination of the beam splitter with 50% of splitting ratio and the reflecting mirror, and can ensure that each light splitting path has the same path in the light splitting component, compared with the currently usually adopted block optical light splitting component system, it has the advantages that the temperature drift is small and the temperature drift of the light beams of the light paths is consistent, and the like.

4. In the four-axis four-subdividing differential interferometer established with the use of the four-axis light splitting module, a common adjustable 45-degree reflecting mirror is inserted at one side of the polarization beam splitter forming the differential system for guiding the reference beam to be transmitted along the direction of the reference reflecting mirror which is arranged in parallel to the measurement reflecting mirror and fixed on the moving object. Compared with the usual differential interferometer which uses 45-degree combining block light splitting component to send the reference light to the reference reflecting mirror, the method ensures that the measurement beam and the reference beam have the same path in the optical components, and have the advantages that the temperature drift is small and the nonlinear errors are fewer, etc. Meanwhile, since the 45-degree reflecting mirror can be independently adjusted, it also has the advantages that the components are easy to process, the light path adjustment is easy, and the like.

5. The four-axis light splitting module in the invention and its light splitting principle can be applied in a plurality of interferometers, for example, being applied in the plane mirror interferometer so as to form the four-axis four-subdividing plane mirror interferometer, etc.

6. The experiment shows that the invention obtains a four-axis four-subdividing differential interferometer and a four-axis four-subdividing plane mirror interferometer with small temperature drift, low nonlinear errors, and high optical efficiency. Through the test, its four-axis nonlinear errors are all less than 2 nm, reaching 0.7 nm. The four-axis optical efficiency is greater than 10%.

The invention has the advantages that the components are easy to process, the light path adjustment is convenient, the temperature drift is small, the temperature drift of the light beams of the light paths is consistent, nonlinear errors are fewer, and the optical efficiency is high.

The experiment has proved that the four-axis interferometer which uses the four-axis light splitting system of the invention has the advantages of the stable system, the convenient adjustment, small temperature drift, and fewer nonlinear errors.

DETAILED DESCRIPTION OF THE INVENTION

The invention is further explained in combination with the embodiments and the accompanying diagrams, but the protection scope of the invention should not be limited by it.

Figure 1:
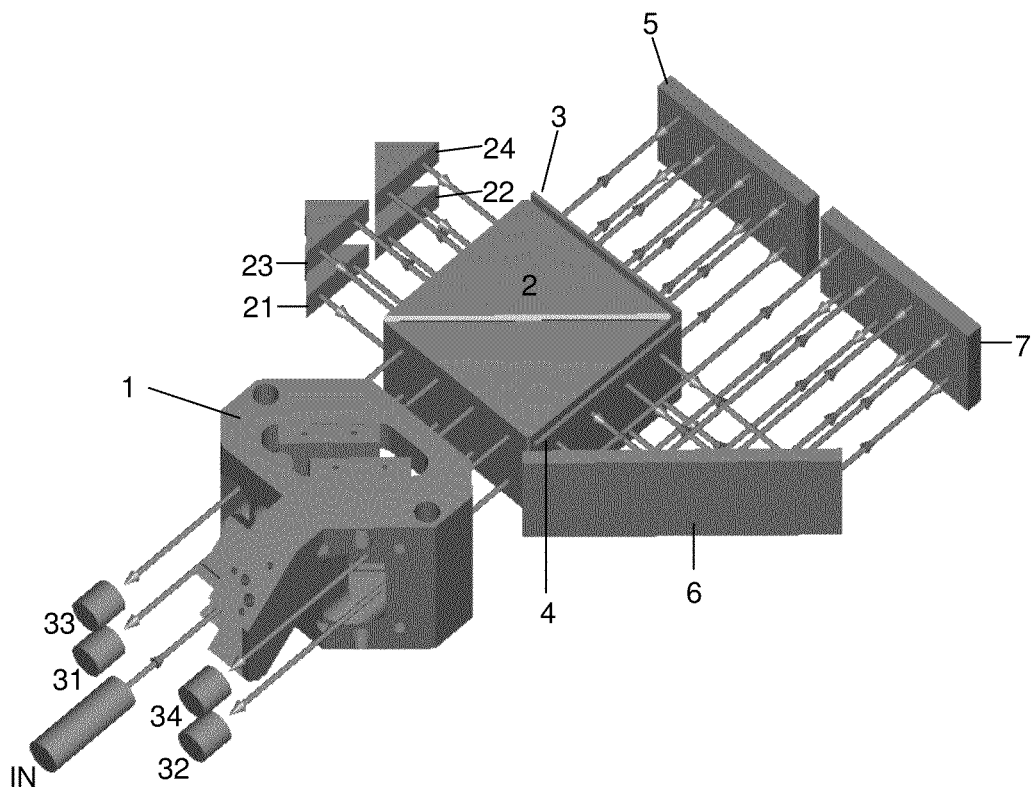
FIG. 1 shows a schematic diagram of the three-dimensional light path of the four-axis four-subdividing differential interferometer of an embodiment 1 of the invention.
Figure 3:
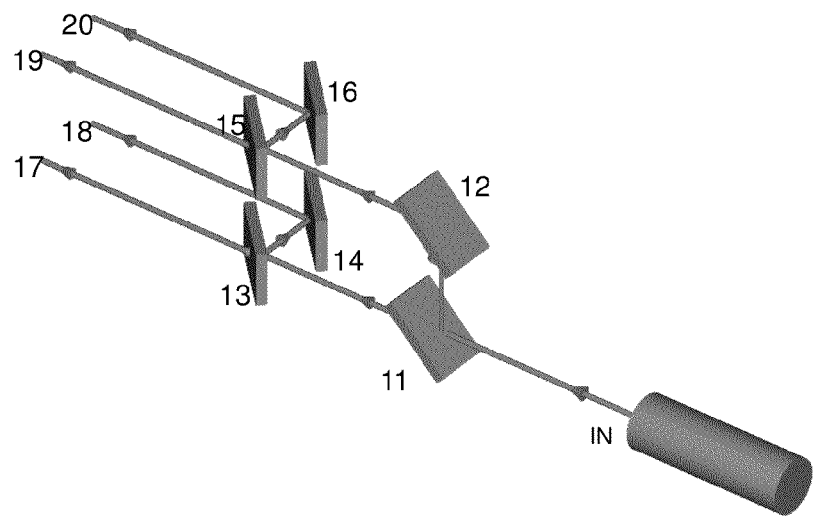
FIG. 3 shows a structural diagram of the three-dimensional light path of the four-axis light splitting module of the invention.

First, referring to FIG. 1, which shows a schematic diagram of the three-dimensional light path of the four-axis four-subdividing differential interferometer of an embodiment 1 of the invention, and also shows a structural schematic diagram of the most preferred embodiments of the invention. The interferometer comprises a four-axis light splitting module 1, a polarizing beam splitter 2, a first ¼ wave plate 3, a second ¼ wave plate 4, a measurement reflecting mirror 5, an adjustable 45-degree reflecting mirror 6, a reference reflecting mirror 7, and four rectangular prisms 21, 22, 23, 24. It can be seen from the diagrams that in the embodiment, the polarization beam IN with two mutually vertical lines output by the double-frequency He—Ne laser is divided into four parallel beams with equal energy after passing through the four-axis light splitting module 1, and has the upper and lower layers in the structure. In the four-axis light splitting module (referring to FIG. 3), a first 45-degree plane beam splitter 11 with 50% of splitting ratio first divides the incident polarization laser into two beams with equal energy, in which the transmission beam is incident on a second 45-degree plane beam splitter 13 with 50% of splitting ratio, and is divided into a transmission beam (beam 17 in the lower layer) and a reflecting beam with equal energy via the second 45-degree plane beam splitter 13, and in which the reflecting light becomes beam 18 in the lower layer after being reflected by the second full-reflecting mirror 14 again, and its direction of propagation is parallel to beam 17 of the transmission beam; however, the reflection beam passing through the first plane beam splitter 11 is incident on the third plane beam splitter 15 with 50% of splitting ratio after being reflected by the first full-reflecting mirror 12, and is divided into two beams with equal energy by the beam splitter 15. The transmission beam is beam 19 in the upper layer. The reflecting beam becomes beam 20 in the upper layer after being reflected by the third full-reflecting mirror 16. The direction of propagation is parallel to beam 19 in the upper layer of transmission. In this way, the double-frequency laser output from the laser is divided into four beams which have equal energy, maintain unchanged horizontal polarization and vertical polarization (depolarization) and are parallel to each other after passing through the four-axis light splitting module 1, and they are used in the precision measurement of four degrees of freedom the four-axis interferometer. The distance between the four beams can be determined by the beam diameter and the test requirement and is generally from 10 to 25 cm. The displacement of X axis and the variation of the four degrees of rotating freedom of X, Y and Z axes can be calculated by detecting the displacement of the four axes.

Subsequently, a polarization beam splitter 2 divides each of beams into measurement beams and reference beams in accordance with different polarization features. The four measurement beams are the four beams which have been transmitted after have passing through the polarization beam splitter 2, whereas the four reference beams are the four beams reflected after passing through the polarization beam splitter 2. Each of the measurement beams is reflected by the measurement reflecting mirror 5 after passing through the first ¼ wave plate 3. The reflected beam passes through the first ¼ wave plate 3 again. The polarization direction of the measurement beams passing through the first ¼ wave plate 3 twice is rotated by 90 degrees so that the measurement beam is reflected (rather than transmitted) on the polarization light splitting interface of the polarization beam splitter 2 and transmitted by the beams of four rectangular prisms 21, 22, 23, 24 so as to achieve the goal of repeating the path four times in the measurement distance by the measurement beam (so does the reference beam) and realizing optical four-subdivision. The four measurement beams reflected by the polarization light splitting interface of the polarization beam splitter 2 enter the four rectangular prisms 21, 22, 23, 24, respectively, and are reflected back to the polarization beam splitter 2 by the four rectangular prisms. After being reflected by the polarization beam splitter 2, the four measurement beams will be reflected by the measurement reflecting mirror 5 again. Hence, after passing through the first ¼ wave plate 3 twice, the polarization direction of the measurement beams is rotated by 90 degrees again so that the measurement beams are transmitted on the polarization beam splitter 2. Finally, it is combined with the above four reference beams that have the similar beam propagation process and have changed the polarization direction twice respectively (the only difference lies in the fact that for the four-axis four-subdividing differential interferometer, a common 45-degree reflecting mirror 6 is inserted into the reference arm for changing the direction of the reference beam by 90 degrees so as to be in parallel to the measurement beam), forming the combined beat frequency output beams associated with a certain measurement axis. The beat frequency beam with the Doppler shift information of the moving object enters a photoelectric receiver after passing through a polarization analyzer which forms a 45-degree axis with the horizontal polarization and the vertical polarization, and is detected by a detector and processed by the computer software so as to obtain the information of the amount of movement of the object to be measured, thereby providing the precise measurement of four degrees of freedom. Since the four beams corresponding to four measurement axes have the short and equal path in the light splitting component, the measurement errors resulted from the temperature drift can be reduced. In addition, since each optical component can be separately adjusted, the beam corresponding to each measurement axis can also be independently adjusted so that it is easy to adjust the light path of the interferometer.

Figure 2:
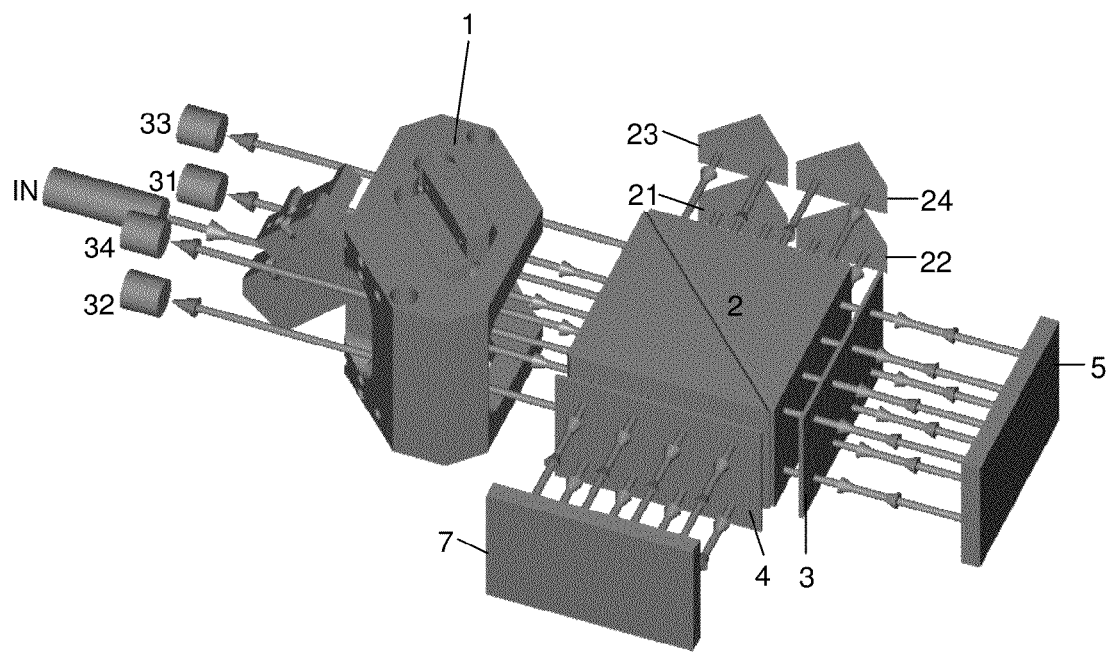
FIG. 2 shows a schematic diagram of the three-dimensional light path of the four-axis four-subdividing plane mirror interferometer of an embodiment 2 of the invention.

The four-axis light splitting principle of the invention can be also applied to the four-axis four-subdividing plane mirror interferometer of the embodiment 2 as shown in FIG. 2. The difference from the four-axis differential interferometer is that the reference reflecting mirror 7 of the four-axis four-subdividing plane mirror interferometer and the measurement reflecting mirror 5 fixed on the object to be measured are arranged in the geometrical configuration vertical to each other. In this way, the four reference beams will be directly irradiated on the reference reflecting mirror 7 with fixed position (placed in the interferometer module) after passing through the common polarization light splitter 2 and the ¼ wave plate 4, without being refracted by a 45-degree reflecting mirror.

The four-axis four-subdividing differential interferometer and the four-axis four-subdividing plane mirror interferometer of the invention have the advantages of small temperature drift, low nonlinear errors, and high optical efficiency. Through the test, the invention system is stable and is easily adjusted. The nonlinear errors of various axes are all less than 2 nm, reaching 0.7 nm. The four-axis optical efficiency is greater than 10%.

We claim:

1. A four-axis four-subdividing interferometer comprising a four-axis light splitting module, and
an interference module,
wherein the four-axis light splitting module and the interference module are sequentially arranged along an incident direction of a polarization orthogonal double-frequency laser;
the four-axis light splitting module comprises a first, a second, and a third splitters, said splitters being plane beam splitters having a 50% splitting ratio and 45-degree angle, and a first, a second, and a third mirrors, said mirrors being full-reflecting mirrors having 45-degree angle;
the first splitter divides the polarization orthogonal double-frequency laser into a transmission beam and a corresponding reflection beam;
the first mirror reflects and changes a direction of the corresponding reflection beam to be in parallel to the transmission beam;
the second splitter and the third splitter are sequentially arranged from bottom to top in a first vertical plane to respectively divide the transmission beam and the corresponding reflection beam with changed direction into subsequent transmission beams and subsequent corresponding reflection beams;
the second mirror and the third mirror are sequentially arranged from bottom to top in a second vertical plane to respectively reflect and change direction of the subsequent corresponding reflection beams to be in parallel to the subsequent transmission beams; and
the second vertical plane is parallel to the first vertical plane.

2. The four-axis four-subdividing interferometer according to claim 1, wherein the first splitter is arranged in the incident direction of the polarization orthogonal double-frequency laser to divides the laser into a first transmission beam and a first reflection beam with equal energy, the first mirror is arranged above the first splitter in a direction of the first reflection beam to reflect and change direction of propagation of the first reflection beam to be in parallel to the incident direction of the laser and direction of the first transmission beam, the second splitter is arranged along a direction of the first transmission beam and divides the first transmission beam into a second transmission beam and a second reflection beam with equal energy, the second mirror is arranged in a direction of the second reflection beam and reflects and changes direction of propagation of the second reflection beam to be in parallel to the second transmission beam, thus, forming two beams of light in parallel in a lower layer, the third splitter is arranged along the changed direction of propagation of the first reflection beam and divides the first reflection beam into a third transmission beam and a third reflection beam with equal energy, and the third mirror is arranged in a direction of the third reflection beam and reflects and changes direction of propagation of the third reflection beam to be in parallel to the third transmission beam so as to form two beams of light in parallel in an upper layer.

3. The four-axis four-subdividing interferometer according to claim 1, wherein the interference module comprises a polarizing beam splitter, a first ¼ wave plate being arranged in a light transmission direction of the polarizing beam splitter, a measurement reflecting mirror being arranged in the light transmission direction of the polarizing beam splitter and being fixed on an object to be measured, a second ¼ wave plate being arranged in a light reflection direction of the polarizing beam splitter, a reference reflecting mirror being arranged in the light reflection direction of the polarizing beam splitter, and two vertically arranged strip rectangular prisms or four rectangular prisms being arranged in two columns and two layers from down to top in a fourth direction of the polarizing beam splitter.

4. The four-axis four-subdividing interferometer according to claim 3, wherein the four rectangular prisms are arranged such that a first rectangular prism and a second rectangular prism are in an upper layer, and a third rectangular prism and a fourth rectangular prism are in a lower layer.

5. The four-axis four-subdividing interferometer according to claim 1, wherein the interference module comprises a polarizing beam splitter, a first ¼ wave plate being arranged in a light transmission direction of the polarizing beam splitter, a measurement reflecting mirror being arranged in the light transmission direction of the polarizing beam splitter and being fixed on an object to be measured, a second ¼ wave plate being arranged in the light reflection direction of the polarizing beam splitter, an adjustable 45-degree full-reflecting mirror for changing a direction of propagation of a reference beam by 90 degrees and being arranged in the light reflection direction of the polarizing beam splitter, a reference reflecting mirror being arranged in a light reflection direction of the adjustable 45-degree full-reflecting mirror and being fixed on the object to be measured, and two vertically arranged strip rectangular prisms or four rectangular prisms arranged in two columns and two layers from down to top in a fourth direction of the polarizing beam splitter.

6. The four-axis four-subdividing interferometer according to claim 5, wherein the four rectangular prisms are arranged such that a first rectangular prism and a second rectangular prism are in an upper layer, and a third rectangular prism and a fourth rectangular prism are in a lower layer.

* * * * *